United States Patent [19]

Taylor

[11] Patent Number: 4,570,339

[45] Date of Patent: Feb. 18, 1986

[54] KITCHEN UTENSIL FOR FOOD RETORT POUCHES

[75] Inventor: Larry W. Taylor, Rexdale, Canada

[73] Assignee: Magic Pantry Foods Inc., Mississauga, Canada

[21] Appl. No.: 625,699

[22] Filed: Jun. 28, 1984

[30] Foreign Application Priority Data

Feb. 15, 1984 [CA] Canada ................................. 447544

[51] Int. Cl.[4] ............................................. B26B 11/00
[52] U.S. Cl. ............................................. 30/2; 7/158; 30/123; 222/80
[58] Field of Search ................. 30/2, 124, 123, 294, 30/289; 222/80, 81, 103, 106; 7/151, 158, 169, 170, 132

[56] References Cited

U.S. PATENT DOCUMENTS

| | | |
|---|---|---|
| 1,795,527 | 3/1931 | Tyreman . |
| 2,391,247 | 12/1945 | Knudtson ................... 30/2 |
| 2,420,460 | 5/1947 | Bowdoin et al. ................... 164/73 |
| 2,457,032 | 12/1948 | Case ................... 211/89 |
| 2,609,715 | 9/1952 | Eades ................... 81/3 |
| 2,681,502 | 6/1954 | Black ................... 30/2 |
| 2,790,579 | 4/1957 | Woldorf ................... 222/103 |
| 2,903,161 | 9/1959 | Stahmer ................... 222/103 |
| 3,387,366 | 6/1968 | Whitman ................... 30/2 |
| 3,774,251 | 11/1973 | Pellman ................... 30/289 X |
| 3,803,713 | 4/1974 | Jones ................... 30/2 |
| 3,854,628 | 12/1974 | Goings ................... 222/103 |
| 4,038,746 | 8/1977 | Bromley ................... 30/2 |

FOREIGN PATENT DOCUMENTS 1455919 11/1976 United Kingdom ................. 30/294

Primary Examiner—Jimmy C. Peters

[57] ABSTRACT

A kitchen utensil for facilitating the removal of the contents from boil-in-the-foil type food pouches (retort pouches). Such retort pouches are usually made from a laminate of three materials, i.e. polyester, which forms the outer layer, aluminum foil, which forms a barrier in the middle, and an inner layer of polypropylene to retain the food taste. The utensil has an elongated handle and a pair of elongated prongs extending in parallel from the handle at one end. The length of the prongs is at least as great as the width of the pouch. The prongs define a gap between them dimensioned to snugly receive two layers of the pouch material. The pouch can thus be inserted into the gap and the prongs moved over the pouch to cause the contents to be squeezed towards one end of the pouch. The utensil preferably also has a pouch opening device located at the free end of one of the prongs.

12 Claims, 6 Drawing Figures

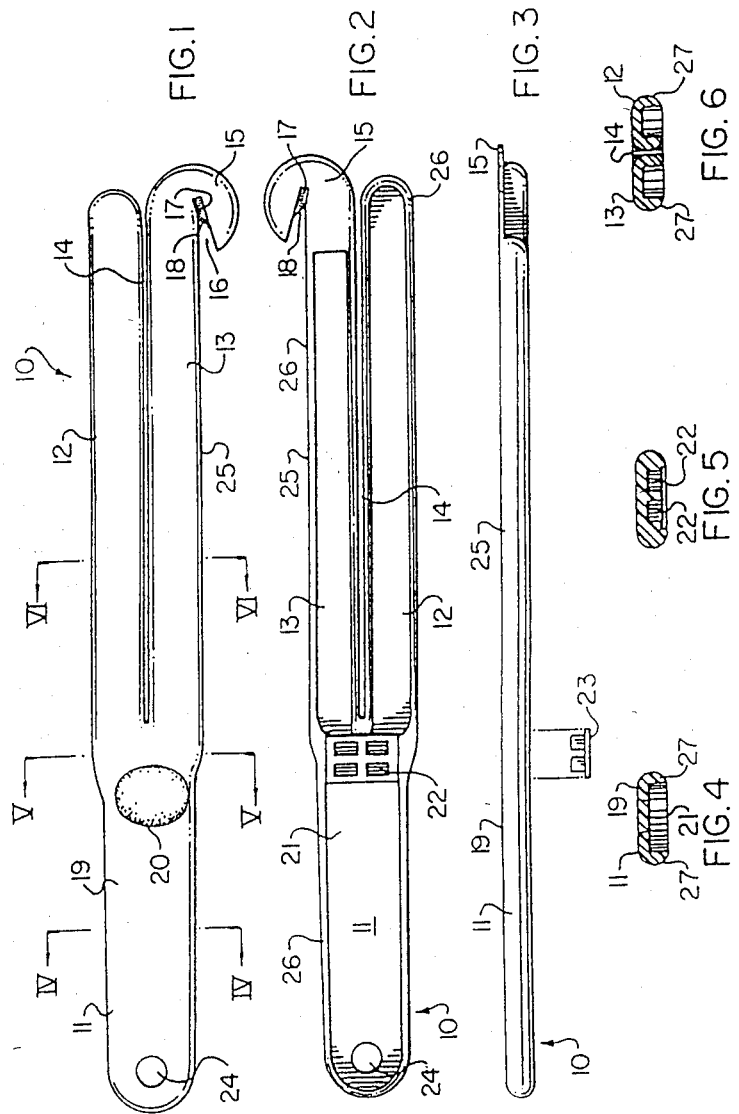

KITCHEN UTENSIL FOR FOOD RETORT POUCHES

This invention relates to a kitchen utensil for facilitating the removal of food from boil-in-the-foil type food pouches (referred to hereinafter as retort pouches).

The marketing of food portions in vacuum sealed retort pouches is becoming increasingly popular.

Pre-portioned entrees, comprising meat and vegetables prepared in sauces or gravies are cooked inside a vacuum-sealed retort pouch, in their own juices. The pouch is preferably made of a trilaminate material, i.e. polyester film, aluminum foil and polypropylene film. The polyester is used to form a tough outer layer. The aluminum forms a central barrier and the polypropylene forms an inner layer that retains the food taste. Due to the thin profile of the pouch material, only a short cooking time is required, which results in a high quality product. The vacuum seal ensures that the food stays safe to eat without refrigeration, freezing, or the need for preservatives. The pouch can thus be stored conveniently on the pantry shelf. When the entree is to be prepared, the pouch can be taken directly from the shelf to a pan of boiling water. Prepared this way, the entree is ready to eat in just five minutes. Alternatively, the contents of the pouch may be transferred to a plate and microwaved for 2 minutes at full power.

One difficulty of this procedure is that the pouch has to be efficiently cut open and the contents emptied onto a plate.

An object of the present invention is to facilitate the removal of the contents of retort pouches immediately prior to serving.

According to the invention there is provided a kitchen utensil for facilitating the removal of the contents from a food item retort pouch made of a flexible material, said utensil comprising: an elongated handle; and a pair of elongated prongs extending in parallel from the handle at one end thereof and defining a gap therebetween dimensioned to snugly receive two layers of said flexible material; whereby said pouch can be inserted into said gap and said prongs moved over said pouch to cause the contents to be squeezed towards an end of the pouch.

One of the prongs of the utensil preferably has a pouch opening device located at its end remote from the handle. This prong also desirably has a straight outer edge for guiding the pouch to the opening device, which is preferably a blade mounted in a slot. This enables the pouch to be cut open and the contents forced out in a particularly simple series of operations while minimizing the handling of the pouch by the user and spillage of the contents.

A preferred embodiment of the present invention is described in the following with reference to the accompanying drawings, in which:

FIG. 1 is a top plan view of a kitchen utensil according to one embodiment of the present invention;

FIG. 2 is an underneath plan view of the utensil;

FIG. 3 is a side elevation of the utensil; and

FIGS. 4, 5 and 6 are cross sections taken on the lines IV—IV, V—V and VI—VI respectively of FIG. 1.

A preferred kitchen utensil 10 shown in the drawings has a handle 11 and a pair of prongs 12, 13 extending in parallel from one end of the handle. The prongs 12,13 are spaced from each other by a small gap 14 and one prong 13 has a curved, hook-like end 15 forming a lateral projection from the prong and defining an outwardly directed slot 16, the open end of which generally faces the handle 11.

A thin metal blade 17 is inserted into the curved end 15, which blade extends across the slot 16. The side of the blade facing the handle 11 has a sharpened edge 18. The blade 17 is fixed to the curved end 15 by ultra-sonic welding.

The upper surface 19 of the handle 11 has a shallow depression 20 for the user's thumb near the junction with the prongs 12, 13. The lower surface 21 of the handle has a plurality of holes 22 for receiving a correspondingly shaped magnet 23 shown in exploded position in FIG. 3. The magnet is fixed in place by any suitable means, e.g. by means of an adhesive or by ultra sonic welding. The handle 11 also has a hole 24 so that it may conveniently be hung from a hook or the like when not in use. The magnet 23 serves a similar purpose, enabling the utensil to be removably attached to a refrigerator door or other metal article when not in use.

The gap 14 between the prongs 12 and 13 is of a suitable length and width to receive a retort pouch in the flattened condition, i.e. it is dimensioned to snugly receive two layers of the trilaminate material of which the pouch is made. The length of the prongs (and thus of the gap) is usually in the range of 14.7 to 15.2 cm, preferably about 15 cm (5.9 inches), although this can be varied considerably to correspond to the width of the retort pouch. The prongs should generally be at least as long as the width of the pouch upon which they are intended to be used. The width of the gap is generally a maximum of about 0.8 mm (approx. 1/32 inch), although this depends on the thickness of the trilaminate material used for the retort pouch.

The utensil is used as follows. When a retort pouch is removed from boiling water, or before the contents can be microwaved, the pouch is first opened by slitting one end with the blade 17. To achieve this, the slot 16 is hooked around one corner of the pouch (which is usually provided with a dotted line) and the utensil is drawn horizontally across the pouch. The pouch is firmly held just below the cutting line. Blade 17 thus opens the pouch. The pouch is then turned over so that the contents can be poured onto a plate. The unopened edge of the pouch is then passed through the gap 14 and, while the user holds the unopened edge firmly in one hand, the utensil is moved downwardly over the pouch. Since the gap 14 is quite narrow this squeezes the pouch and forces any food remaining in the pouch to the open end. The utensil thus enables the pouch to be slit open and all the contents removed in a most simple, clean and safe manner.

As shown in the drawings, the slot 16 is fairly wide at its open end and narrows to some extent towards its closed end and the blade 17. This enables the pouch material to be inserted easily into the slot, but as the pouch material is drawn towards the blade, the sides of the slot firmly contact the pouch and hold it steadily as the material is sliced. The width of the slot adjacent to the blade should be approximately twice the width of the trilaminate material used to form the retort pouch, although a slightly increased width is usually satisfactory, e.g. up to about 2 mm (approx. 0.07874 inch). It will also be seen from the drawings that the slot 16 is oriented at a slight angle with respect to the prong 13, usually up to about 30°, preferably by 15°–25°. This orientation is a convenient way of making the slot 16 wider at its open end as explained above. The sharp edge 18 of the blade 17 extends obliquely across the slot 16 to facilitate cutting of the trilaminate material.

The free end of the prong 12 and the outer edge of the curved end 15 of prong 13 are rounded as shown. This creates a funnel-like shape at the open end of the gap 14, i.e. the gap increases in width at the open end, so that the pouch can easily be inserted into the gap. Moreover, the rounded shapes reduce the likelihood of the pouch being accidentally pierced by the prongs as the pouch is being manipulated.

The fact that the blade 17 is located at the extreme end of one of the groups is particularly advantageous because this part of the utensil is as far as possible from the handle 11. This means that as the pouch is being slit open by the blade, it is most unlikely that the hot contents of the pouch will contact the user's hand, which could result in scalding. There is an additional safety feature in that the blade is completely inset into the material of the device, thereby ensuring that there is no possibility of the blade accidentally injuring the user. Moreover, the straight outer edge 25 of prong 13 supports the pouch during the opening procedure and guides it steadily to the mouth of slot 16. This enables the opening procedure to be carried out particularly smoothly and simply.

For example, if the top of the pouch is held in the left hand just below the cutting line, and the utensil is held in the right hand, the pouch can be opened by first locating the utensil between the pouch and the user's body. The curved end 15 is located around the left hand side edge of the pouch near the top (on the cutting line) so that the edge enters the slot 16. A horizontal left to right movement of the utensil then cuts open the top of the pouch with the unopened part of the pouch being guided along edge 25 of prong 13 to slot 16. After the opening procedure, the pouch is inverted to remove the contents and the user then has only to insert the right hand edge of the pouch near the top (previously the bottom) into the open end of gap 14, move the utensil to the left so that the pouch fully enters the gap, and then move the utensil downwardly to empty the pouch completely.

The utensil, except for the blade 17 and the magnet 23, is preferably made by injection moulding of a suitable plastic material. As shown in FIGS. 4–6, the handle 11 and prongs 12, 13 are generally flat, but raised ribs 27 are provided at the outer margins to impart strength and to provide a rounded contour unlikely to result in accidental slicing of the pouch. This rounded contour (see FIG. 6) allows the pouch walls to be drawn in smoothly to the narrowest part of the gap 14 and allows food contents between the pouch walls to be smoothly squeezed out. The ribs extend from the under side of the utensil and are easily formed by known injection moulding techniques. The resulting utensil is light in weight, inexpensive to manufacture, easy to clean and easy to store. Moreover, the flat upper surfaces of the handle and prongs may be used for trademarks, advertising or instructions for use.

Although a preferred embodiment has been described in detail above, various changes and alterations can be made without departing from the scope of the invention as defined by the following claims. For example, the hanlde and prongs could be made circular in cross-section instead of generally flat, although the embodiment in which they are flat is much preferred for the reasons given above. The utensil could alternatively be made from metal or wood instead of plastic. Although the utensil is intended for use with retort pouches that do not require freezing, the utensil may also be used with frozen food pouches once the contents have been heated. Other variations will readily occur to persons skilled in this art and are included in the scope of the invention.

I claim:

1. A kitchen utensil for facilitating the removal of the contents from a food item retort pounch made of a flexible material, said utensil comprising:
   an elongated handle;
   a pair of elongated prongs extending in parallel from the handle at one end thereof and defining a gap therebetween dimensioned to snugly receive two layers of said flexible material; and
   a pouch opening device located at an end of one of said prongs remote from said handle, said pouch opening device comprising a lateral projection from said one of said prongs defining a slot having an open end facing said handle, and a blade traversing said slot.

2. A utensil according to claim 1 wherein the slot is of increased width adjacent said open end.

3. A utensil according to claim 1 wherein said blade traverses the slot obliquely.

4. A utensil according to claim 1, wherein said prong has a straight outer edge for guiding said pouch to said open end of the slot.

5. A utensil according to claim 1, wherein the ends of the prongs remote form the handle define an open end of said gap and wherein said ends are shaped so that the gap increases in width at said open end.

6. A utensil according to claim 1, wherein the ends of the prongs remote from the handle are rounded.

7. A utensil according to claim 1, wherein the length of the prongs lies in the range of 14.7 to 15.2 cm.

8. A utensil according to claim 1, wherein the width of the gap is 0.8 mm or less.

9. A utensil according to claim 1, wherein the sides of the prongs adjacent to the gap are of rounded profile in cross-section.

10. A utensil according to claim 1, including means for suspending the article during storage, said means being selected from the group consisting of a hole in the handle for receiving a hook and a magnet for securing the utensil to a ferrous metal surface.

11. A utensil according to claim 1, wherein the handle and prongs are flat and upstanding reinforcing ribs are provided at the outer margins thereof.

12. A utensil according to claim 1, made of injection moulded plastic.

* * * * *